Nov. 11, 1924.                                                          1,514,868

A. SOLOSABAL ET AL

HEADLIGHT FOR MOTOR VEHICLES

Filed Sept. 25, 1922

INVENTORS
ANDRES SOLOSABAL
LLOYD G. RIPPEY AND
FRANK THURBER
BY Albert C. Bree
ATTORNEY Patented Nov. 11, 1924.

1,514,868

UNITED STATES PATENT OFFICE.

ANDRES SOLOSABAL, OF BOISE, IDAHO, AND LLOYD G. RIPPEY AND FRANK THURBER, OF LOS ANGELES, CALIFORNIA.

HEADLIGHT FOR MOTOR VEHICLES.

Application filed September 25, 1922. Serial No. 590,258.

*To all whom it may concern:*

Be it known that we, ANDRES SOLOSABAL, of Boise, in the county of Ada and State of Idaho, and LLOYD G. RIPPEY and FRANK THURBER, both of Los Angeles, in the county of Los Angeles and State of California, and all citizens of the United States, have invented a new and useful Improvement in Headlights for Motor Vehicles, of which the following is a specification.

Our invention relates to an improved means for mounting reflectors in headlights of the class set forth, such that a reflector may be tilted vertically in the casing of a headlight after the casing is rigidly secured to its support, so that the axis of the reflector may be given any desired inclination to a horizontal plane. Our invention is particularly adapted for use on motor vehicles, for example passenger cars and trucks, using public streets and highways. In connection with the use of headlights just referred to, it is well known that considerable difficulty is experienced by pedestrians and drivers of motor vehicles from the blinding glare of the headlights, which has resulted in much restrictive legislation and the use of many auxiliary devices in one manner or another to either shield the eyes of pedestrians, or diffuse the direct rays from the reflector, and ostensibly without impairing the lighting of the roadway. Devices of the kind referred to, however, invariably decrease the efficiency of illumination by the headlight, either by intercepting a considerable portion of the light rays or reducing the intensity of the light beam from the reflector. By our invention we avoid decreasing the illumination referred to at the same time that we establish a non-glaring relation of the light beam, by hinging the lower edge of the reflector to the casing and connecting the upper edge of the reflector with the casing by an adjusting screw, by which the axis of the light beam may be accurately adjusted relatively to the roadway to direct the light on the roadway where it belongs, and below the line of sight of pedestrians and drivers of other vehicles.

Our invention will best be understood by reference to the accompanying drawings showing a preferred embodiment thereof, in which—

Figure 1:
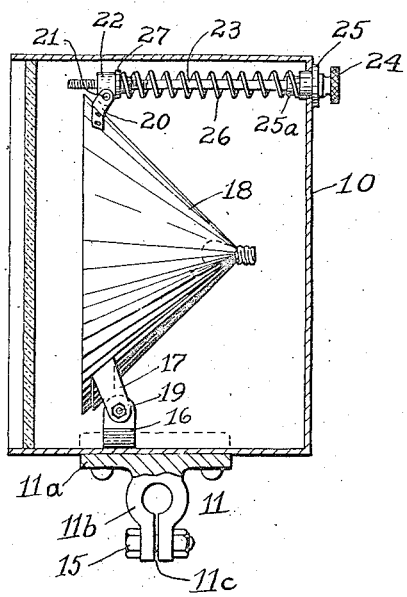
Figure 2:
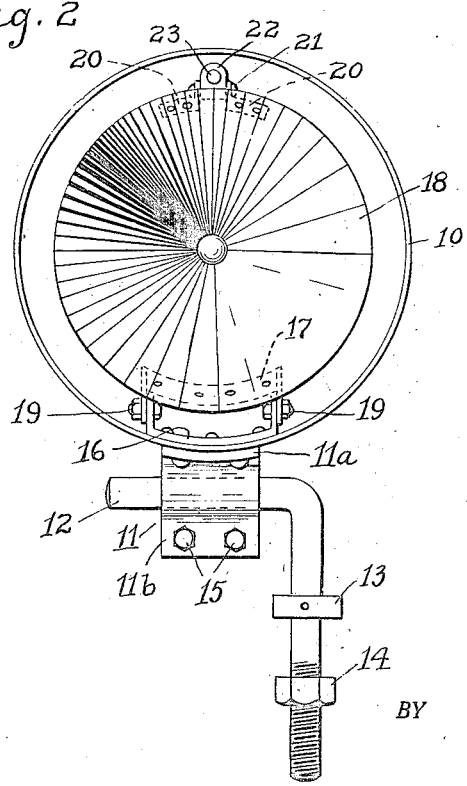

Fig. 1 shows a headlight in accordance with our invention, with the casing thereof in vertical, central sectional view and with the reflector thereof in side elevation, and Fig. 2 is a front elevation of the parts shown in Fig. 1.

Similar numerals refer to similar parts throughout the several views.

As shown in the drawings, our improved headlight consists of a casing 10 provided with a mounting clamp 11 secured to its lower portion in any desired manner for engaging, as indicated in Fig. 2, a supporting rod 12, which may be provided with a collar 13 and a clamping nut 14 for engaging any convenient support, not shown, adapted to receive said rod.

The mounting clamp 11 as shown, comprises a base portion 11ª secured to the casing 10, from which a boss 11ᵇ projects, said boss being provided with a bore to receive the rod 12. A slot 11ᶜ is formed through one side of said boss into its bore, and clamping bolts 15 extend through the slotted portion of said boss to clamp it securely to said rod.

The casing 10 has rigidly secured to the lower portion of its inner surface, a first yoke 16 by suitable means, for example rivets or screws, said yoke extending transversely of said casing. A second yoke 17 is secured to the lower portion of the back surface of the reflector 18 by suitable means, for example rivets or screws, and the downwardly projecting ends of the yoke 17 are pivotally connected with the upwardly projecting ends of the yoke 16, by screws or bolts 19 forming a hinge support for the reflector extending transversely thereof. As a result of the construction described, movement of the reflector on its said hinge support, swings the axis of the reflector either upwardly or downwardly as desired, relatively to the casing 10, in a vertical plane extending centrally and longitudinally through the reflector.

The reflector 18 has secured to the upper portion of its rear surface by suitable means, for example rivets or screws, ears 20 through which a pivot pin 21 extends transversely of the reflector. Said pin 21 also extends through a nut 22 located between the ears 20 and in engagement with the threads on the forward end of an adjusting screw 23, extending longitudinally of the casing 10 through its rear wall, outside of which it has rigidly secured to it, an operating head 24. A bushing 25 is preferably secured in the rear wall of the casing 10 to form a support for the screw 23, the inner end of said bushing being of reduced diameter, as indicated at 25ª, to form a seat for one end of a spring 26 encircling the screw 23, the other end of which spring engages a similar seat formed on a shouldered collar 27, loosely carried on the screw 23 adjacent the nut 22. The spring 26 is held in compressed condition by the bushing 25 and collar 27, and since the body portion of the screw 23 is a sliding fit in the bushing 25, said spring holds the nut 22, and therefore the upper portion of the reflector 18, as far forwardly at all times, as the adjustment of the screw 23 will permit, said spring being of sufficient strength to move the reflector 18 on its hinge support, to hold the head 24 tightly against the bushing 25 and thus to take up any lost motion due to loose fit of the parts, and prevent rattling of the parts when in use.

In using our improved headlight, it is first secured rigidly in desired position by means of the mounting clamp 11, with its axis extending in as nearly the desired direction as can readily be effected. In practice, it is difficult, if not impossible, to accurately secure a desired inclination of the light beam vertically, by means of the mounting clamp 11, or equivalent devices, since no means is provided in connection with said devices for accurately imparting minute movement to the headlight. With the headlight securely clamped in place, the inclination of the light beam from the reflector 18 is determined by lighting the lamp in the headlight. If the light beam is directed upwardly sufficiently to project the concentrated rays of the beam into the eyes of pedestrians or other vehicle drivers, or to cause an undesirable glare, the axis of the light beam may readily be given a greater inclination downwardly, by turning the screw 23 to relieve the spring 26, which thereupon moves the upper portion of the reflector forwardly until the light beam is given the desired downward inclination. On the other hand, if the initial inclination of the light beam is so great in a downward direction, that the roadway is illuminated only immediately in front of the vehicle, the light beam is readily given a less inclination downwardly, by turning the screw 23 to move the upper portion of the reflector 18 rearwardly against the action of the spring 26, until the roadway is properly illuminated, without producing undesirable glare or blinding effect upon pedestrians or other vehicle drivers. It will be observed that our device permits minute movement of the reflector in either direction and therefore ready and accurate adjustment of the inclination of the light beam vertically; also that it permits ready change in said adjustment if found desirable to meet different driving conditions or different types of lamps.

While we have shown our invention in the particular embodiment above described, it will be understood that we do not limit ourselves to this exact construction, as we may employ equivalents thereof known to the art at the time of the filing of this application without departing from the scope of the appended claim.

What we claim is:

In a headlight, the combination of a casing, a first yoke extending transversely of the casing on its inner surface and secured to said casing and having end ears projecting towards the central portion of the casing, a reflector in the casing, a second yoke extending transversely of the reflector on its outer surface and secured to the reflector and having end ears projecting outwardly from the reflector adjacent the ears on said yoke, pivotal connections each connecting adjacent ears of said yokes, and tilting devices comprising a block pivotally connected to said reflector and a screw threaded through said block and extending through said casing.

In witness whereof, we hereunto subscribe our names this 16 day of September, A. D. 1922.

ANDRES SOLOSABAL.
LLOYD G. RIPPEY.
FRANK THURBER.